US 8,229,048 B2

(12) United States Patent
Risk et al.

(10) Patent No.: US 8,229,048 B2
(45) Date of Patent: Jul. 24, 2012

(54) USE OF EMPHASIS TO EQUALIZE HIGH SPEED SIGNAL QUALITY

(75) Inventors: Gabriel C. Risk, San Francisco, CA (US); Drew G. Doblar, San Jose, CA (US); Pruthvi A. Chaudhari, East Palo Alto, CA (US)

(73) Assignee: Oracle America, Inc., Redwood City, CA (US)

(*) Notice: Subject to any disclaimer, the term of this patent is extended or adjusted under 35 U.S.C. 154(b) by 986 days.

(21) Appl. No.: 12/208,898

(22) Filed: Sep. 11, 2008

(65) Prior Publication Data

US 2009/0074049 A1    Mar. 19, 2009

Related U.S. Application Data

(60) Provisional application No. 60/971,355, filed on Sep. 11, 2007.

(51) Int. Cl.
*H04B 1/10* (2006.01)

(52) U.S. Cl. ............................................. 375/350

(58) Field of Classification Search ............. 375/224, 375/226, 229, 230, 232, 233, 296, 340, 346, 375/349, 350, 354, 373; 370/286, 329, 438, 370/447, 906
See application file for complete search history.

(56) References Cited

U.S. PATENT DOCUMENTS

| | | | | |
|---|---|---|---|---|
| 5,675,612 A * | 10/1997 | Solve et al. | ................... | 375/326 |
| 6,175,591 B1 * | 1/2001 | Iwamatsu | ..................... | 375/232 |
| 7,242,712 B1 * | 7/2007 | Katic | ............................ | 375/233 |
| 7,756,197 B1 * | 7/2010 | Ferguson et al. | ............. | 375/224 |
| 2002/0181633 A1 * | 12/2002 | Trans | ............................ | 375/354 |
| 2002/0196880 A1 * | 12/2002 | Koslov | ......................... | 375/349 |
| 2005/0122954 A1 * | 6/2005 | Adamiecki et al. | ........... | 370/351 |
| 2007/0030890 A1 * | 2/2007 | Yamaguchi | ................... | 375/233 |
| 2007/0041469 A1 * | 2/2007 | Dally | ............................ | 375/296 |
| 2008/0192814 A1 * | 8/2008 | Hafed et al. | ................... | 375/224 |
| 2008/0304557 A1 * | 12/2008 | Hollis | ............................ | 375/231 |
| 2008/0310489 A1 * | 12/2008 | Ichiyama et al. | ............. | 375/226 |
| 2010/0046600 A1 * | 2/2010 | Zerbe et al. | ................... | 375/233 |

* cited by examiner

*Primary Examiner* — David C. Payne
*Assistant Examiner* — Syed Haider
(74) *Attorney, Agent, or Firm* — Osha Liang LLP

(57) ABSTRACT

A method, apparatus, and system for minimizing ringing in a high speed channel between a transmitter and a receiver in a circuit, including a component for initializing an n-tap equalization filter. The n-tap equalization filter includes numerous taps, each associated with each of numerous jitter pulses received from the transmitter at the receiver and over the channel. Many of the jitter pulses are greater than two. Further, each tap occurs at a time-domain point related to a time of a corresponding jitter pulse included within the numerous jitter pulses. Moreover, a component for applying the n-tap equalization filter to a subsequent signal sent over the channel is also included.

18 Claims, 5 Drawing Sheets

USE OF EMPHASIS TO EQUALIZE HIGH SPEED SIGNAL QUALITY

CROSS-REFERENCE TO RELATED APPLICATION

This application claims priority, pursuant to 35 U.S.C. §119(e), of U.S. Provisional Application Ser. No. 60/971,355 entitled "USE OF EMPHASIS TO EQUALIZE HIGH SPEED SIGNAL QUALITY," filed on Sep. 11, 2007 in the names of Gabriel C. Risk, Drew G. Doblar, and Pruthvi Chaudhari, and is hereby incorporated by reference.

BACKGROUND

High speed data communication in a circuit channel requires less noise. However, each pulse/bit sent over the channel may cause a series of reflections, and those reflections sum to cause jitter on later pulse/bits. The duration of the reflections may be highly channel dependent, but a typical fully buffered dual in-line memory module (FB-DIMM) channel architecture may result in significant ringing for between 5 and 10 ns after an edge. Thus, there is a desire to minimize intersymbol interference (ISI) due to jitter.

Channels can be characterized using their S-parameter representations. A typical channel will show increasing loss as the frequency increases, resulting in a degradation of the amplitude and an increase in the amount of energy present after the main cursor has passed.

SUMMARY OF INVENTION

In one aspect, embodiments of the present invention relate to a method for minimizing ringing in a high speed channel between a transmitter and a receiver in a circuit, comprising receiving a plurality of signals from the transmitter to the receiver via the channel, wherein each signal of the plurality of signals comprises a plurality of pulses representing a bit stream, aggregating the plurality of received signals into an aggregate voltage signal comprising a main cursor pulse and a plurality of jitter pulses, wherein each jitter pulse of the plurality of jitter pulses comprises a lesser magnitude than the main cursor pulse, determining a voltage magnitude and a time for each of the plurality of jitter pulses, and initializing an n-tap equalization filter comprising a plurality of taps, wherein each tap of the plurality of taps is associated with at least one jitter pulse of the plurality of jitter pulses, wherein each tap of the plurality of taps occurs at a time-domain point related to the time of the corresponding jitter pulse, wherein each tap has an output voltage related to an inverse of a voltage magnitude of the corresponding jitter pulse, and wherein the n-tap equalization filter is configured to equalize signals transmitted over the channel.

In one aspect, embodiments of the present invention relate to a circuit for minimizing ringing in a high speed channel between a transmitter and a receiver, comprising a component for initializing an n-tap equalization filter comprising a plurality of taps associated with a different one of a plurality of jitter pulses received from the transmitter at the receiver and over the channel, wherein a number of the plurality of jitter pulses is equal to at least two, and wherein each tap occurs at a time-domain point related to a time of a corresponding jitter pulse included within the plurality of jitter pulses, and a component for applying the n-tap equalization filter to a subsequent signal sent over the channel.

In one aspect, a system for minimizing ringing in a high speed channel between a transmitter and a receiver in a circuit, comprising a component for initializing an n-tap equalization filter comprising a plurality of taps associated with a different one of a plurality of jitter pulses received from the transmitter at the receiver and over the channel, wherein a number of the plurality of jitter pulses is greater than two, wherein each tap occurs at a time-domain point related to a time of a corresponding jitter pulse included within the plurality of jitter pulses, and a component for applying the n-tap equalization filter to a subsequent signal sent over the channel.

Other aspects and advantages of the invention will be apparent from the following description and the appended claims.

DETAILED DESCRIPTION

Figure 1:
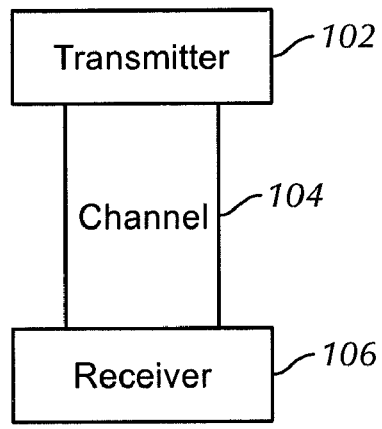
FIG. 1 shows a block diagram in accordance with one or more embodiments of the claimed invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method for reducing intersymbol interference. More specifically, embodiments of the claimed invention are directed to a method for minimizing ringing in a high speed channel between a transmitter and a receiver in a circuit.

FIG. 1 shows a system 100 in accordance with one or more embodiments. The system 100 includes a transmitter 102, a channel 104, and a receiver 106. In one or more embodiments, the transmitter 102 may be in communication with the receiver 106 over the channel 104. One of ordinary skill in the art will appreciate that the transmitter 102 and/or the channel 104 may be a fully buffered dual in-line memory module (FB-DIMM). Further, one of ordinary skill in the art will appreciate that the transmitter 102 may also be any electronic device, component, circuit, memory component, application-specific integrated circuit (ASIC), a processor, or the like, capable of producing a plurality of pulses to represent a plurality of bits. Still further, one of ordinary skill in the art will also appreciate that the channel 104 may be any electronic device, ASIC, component, circuit, or the like, that may include a bus, a circuit, or a filter, such that the channel 104 is capable of transmitting or communicating a plurality of pulses from a first component to a second component. One of ordinary skill in the art will also appreciate, that in one or more embodiments, a receiver 106 may be any electronic device, component, ASIC, circuit, or the like, capable of receiving a plurality of pulses.

In this embodiment, a pulse that is produced, transmitted, or received by the transmitter 102, channel 104, or the receiver 106, respectively, may be a signal. The amount of pulses sent over the channel 104 may be used to determine the amount of energy sent over the channel 104. Specifically, each pulse represents a bit sent through the channel 104, such that each pulse causes a series of reflections. Thus, jitter on later pulses is caused by the sum of these reflections. Although the duration of the reflections may be highly channel dependent, a typical FB-DIM) channel architecture may result in significant ringing for between 5 and 1011 s after an edge.

In one or more embodiments, a finite impulse response (FIR) filter may be used to equalize the output of a transmitter over the channel. By applying equalization, ringing may be reduced, thus reducing intersymbol interference (ISI) and increasing the received eye quality.

An FIR filter is a type of a digital filter. The FIR filter may be characterized by a differential equation, which defines how the input signal is related to the output signal:

$$y[n]=b\_0*x[n]+b\_1*x[n-1]+\ldots+b\_N*x[n-N]$$

In this equation, x[n] is the input signal, y[n] is the output signal, bi are the filter coefficients, and N is the filter order. An Nth-order filter has (N+1) terms on the right-hand side, commonly referred to as taps. Thus, a given FIR filter may have n-taps.

In one or more embodiments, an n-tap FIR filter may be designed by selecting the integer N and the coefficients, such that the system has specific characteristics. One of ordinary skill in the art will appreciate that methods for finding the coefficient include: a window design method; a frequency sampling method; weighted least squares method; minimax method; or an equiripple design.

In one or more embodiments, an n-tap FIR filter may be embodied in hardware and/or software. A circuit, comprising a complementary metal-oxide-semiconductor (CMOS) circuit, a bipolar junction transistor (BJT), resistors, transistors, or the like, may embody the n-tap FIR filters. Parameters for the magnitude of the taps, e.g., b_0 . . . b_N, may be provided as control input to the circuit.

Thus, referring to FIG. 1, in one or more embodiments, channel 104 may include the circuit component embodying an n-tap filter. Channel 104 may filter a signal of a plurality of pulses from transmitter 102 to receiver 106. Further, channel 104 may equalize or de-emphasize the signal based on the n-tap FIR filter. In one or more embodiments, the number n for the FIR filter for channel 104 may be greater than two.

Figure 2:
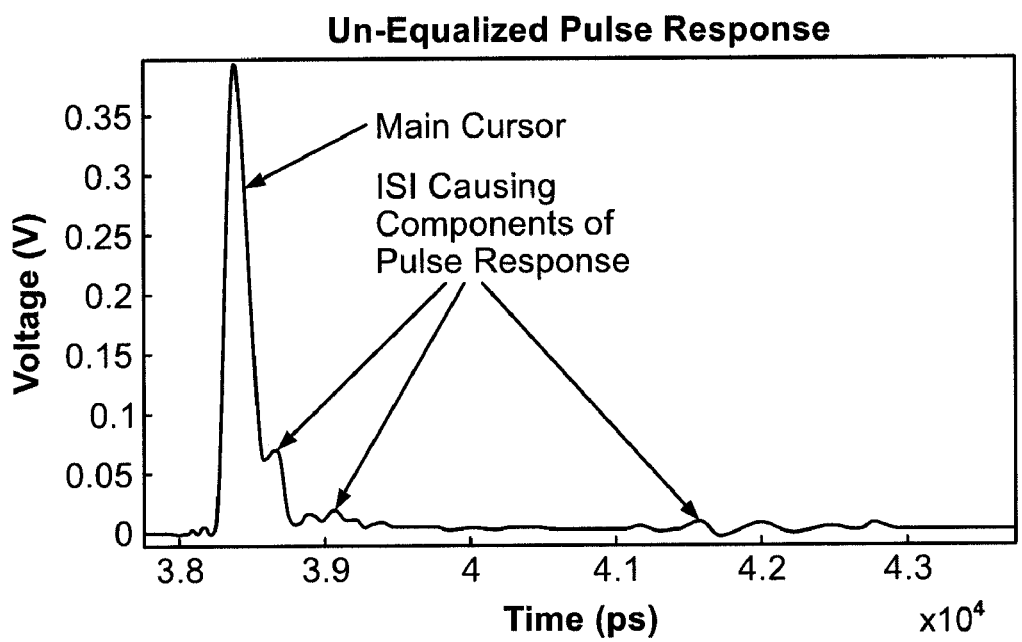
FIG. 2 shows a graph in accordance with one or more embodiments of the claimed invention.

Referring now to FIG. 2, an un-equalized pulse response is shown in accordance with one or more embodiments of the claimed invention. In this embodiment, the un-equalized pulse response is set at 11.2 Gb/s. This pulse shows the effects of intersymbol interference (ISI) on a channel, such as channel 104 of FIG. 1. In this embodiment, because of the increased amount of ISI, the channel 104 will not operate at 11.2 Gb/s without equalization. As shown in FIG. 2, the pulse response has significant ringing (labeled ISI) following the large main cursor peak, which may result in degradation of the received eye.

Figure 3A:
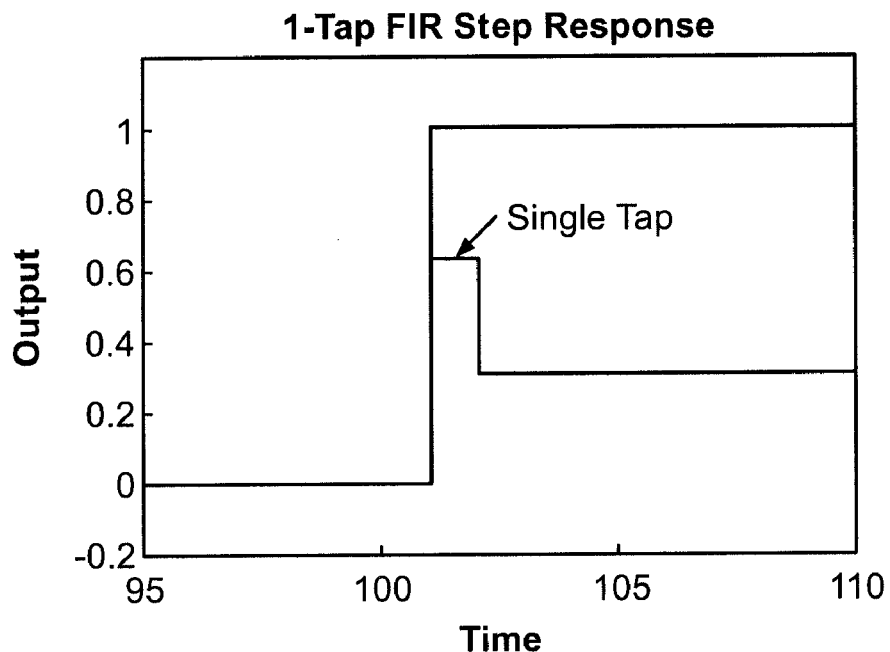
FIG. 3A shows a graph in accordance with one or more embodiments of the claimed invention.
Figure 3B:
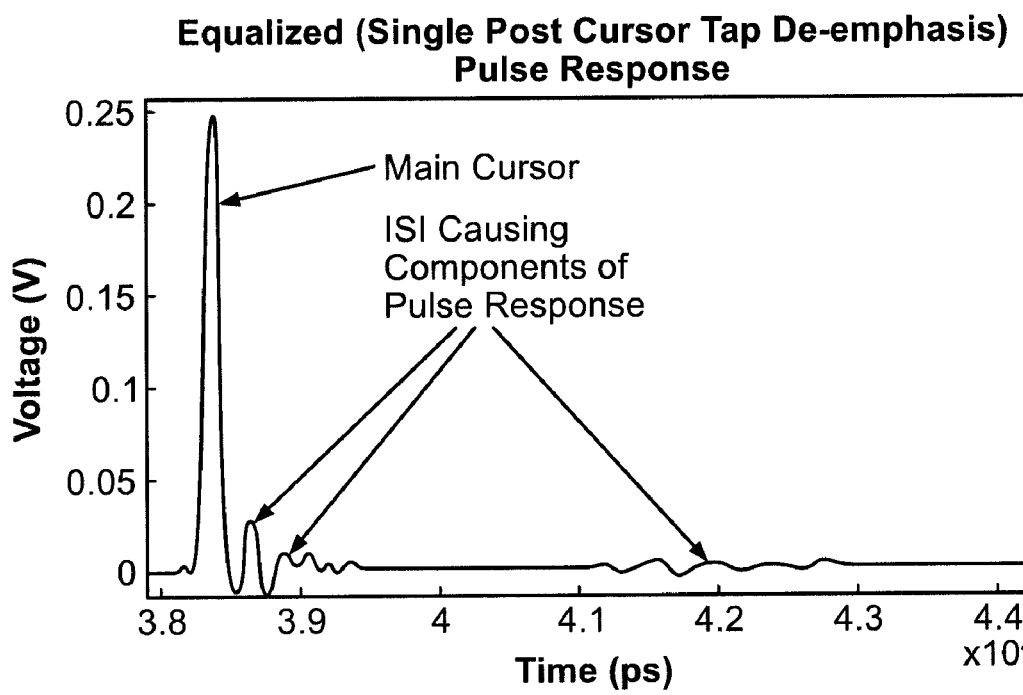
FIG. 3B shows a graph in accordance with one or more embodiments of the claimed invention.

Referring now to FIGS. 3A and 3B. FIG. 3A shows a single tap FIR time domain step response in accordance with one or more embodiments of the claimed invention. FIG. 3B shows a single tap FIR de-emphasis added at the transmitter to the pulse response of FIG. 2. As shown, the resulting ISI is significantly reduced, resulting in the ability to transmit data down this channel at 11.2 Gb/s. One of ordinary skill in the art will appreciate that for lower speed application (<5 Gb/s), use of a single tap FIR filter is most likely sufficient. As the data rate increases, however, this may no longer be enough equalization to allow proper receipt of the eye.

Thus, in one or more embodiments, the use of de-emphasis to further equalize the channel is expanded by using only the transmitter. Specifically, by adding additional taps, which can have either a positive or negative sign, additional equalization can be achieved. As such, one or more embodiments of the claimed invention utilizes both positive and negative taps to compensate for small, but problematic reflections. In particular, a positive second tap is generally the preferred technique for embodiments of the claimed invention.

Figure 4A:
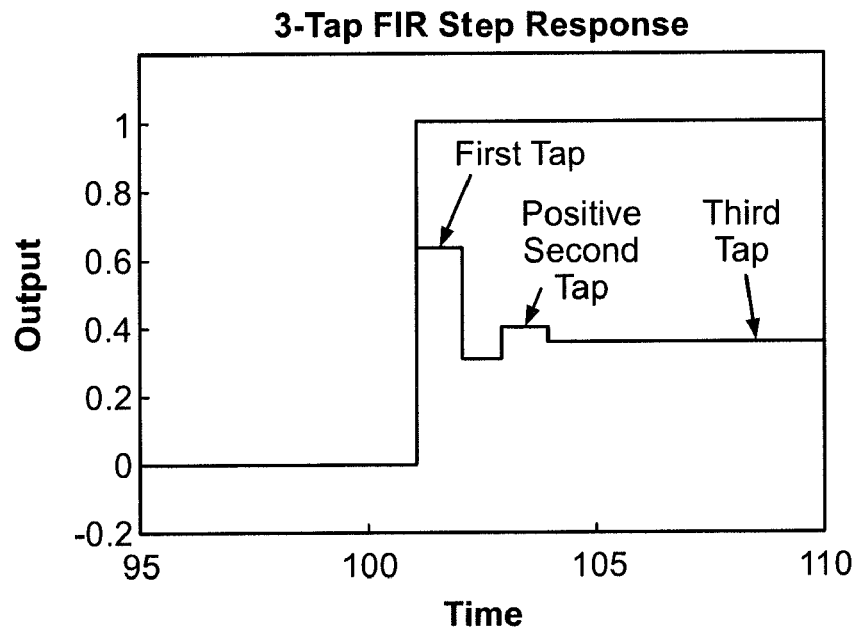
FIG. 4A shows a graph in accordance with one or more embodiments of the claimed invention.
Figure 4B:
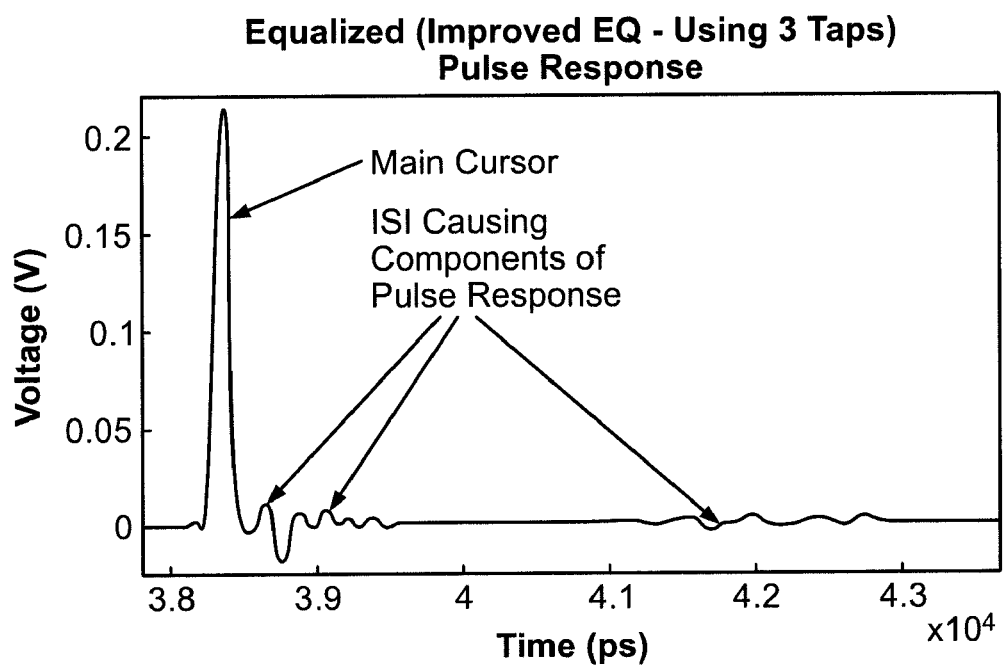
FIG. 4B shows a graph in accordance with one or more embodiments of the claimed invention.

Accordingly, FIG. 4A shows a 3-tap FIR step response. As shown, the second tap is positive resulting in an upward movement of the time domain waveform. FIG. 4B shows, in a time domain, a 3-tap FIR equalization applied at the transmitter to the pulse response of the signal of FIG. 2. In one or more embodiments, the tap coefficients may include: [0.3 0.05 −0.05]. Use of the 3-tap FIR may significantly reduce the ISI/ringing/jitter, after the main cursor, in one or more embodiments. In this embodiment, the improvement between the signal of FIG. 2 and FIG. 3B is about a 10 ps of eye width and a 20 mV of eye height improvement. One of ordinary skill in the art will appreciate that improvements such as these are very significant for high data rates, e.g., 11.2 Gb/s.

Figure 5A:
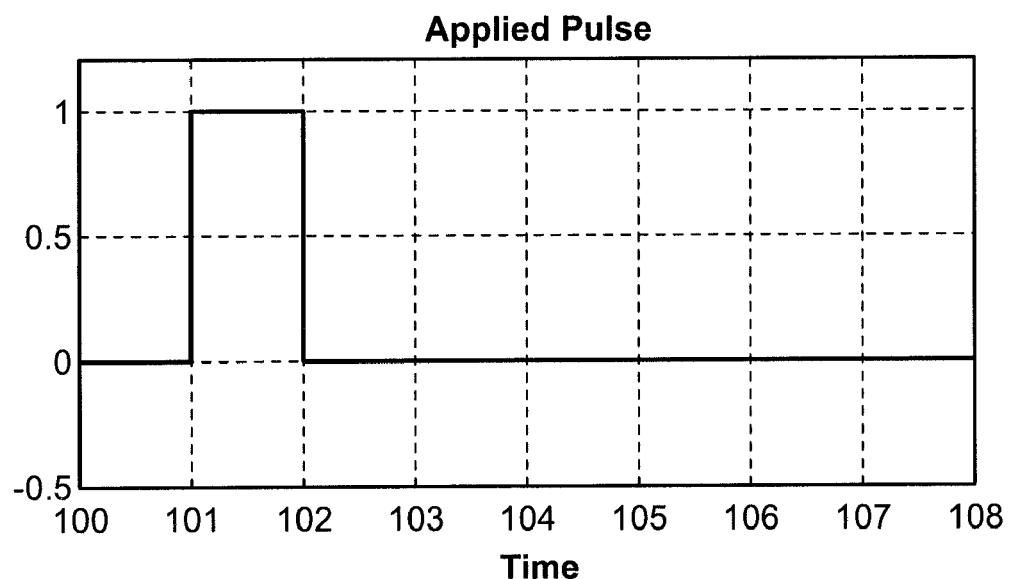
FIG. 5A shows a graph in accordance with one or more embodiments of the claimed invention.
Figure 5B:
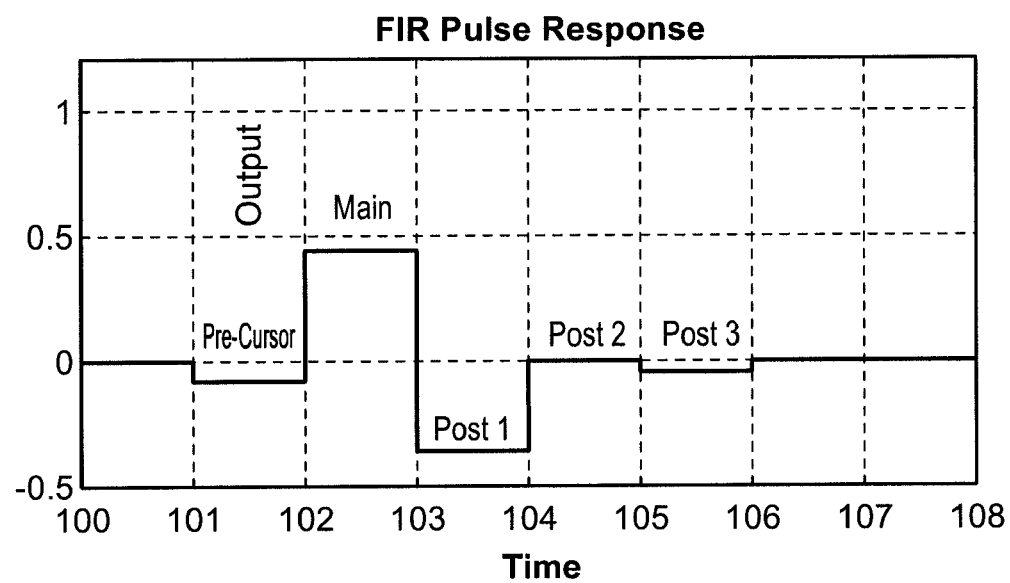
FIG. 5B shows a graph in accordance with one or more embodiments of the claimed invention.

Referring now to FIGS. 5A and 5B, a 5-tap FIR step response (FIG. 5B) as applied to a pulse (FIG. 5A) is shown. FIG. 5B includes a negative pre-cursor that occurs at the same time (time 101-102) as the applied pulse. As shown, the main pulse output of the 5-tap FIR occurs one time step after the applied pulse of FIG. 5A. The 5-tap FIR equalization filter provides further reduction of ISI/ringing/jitter of a signal on the channel.

Figure 6:
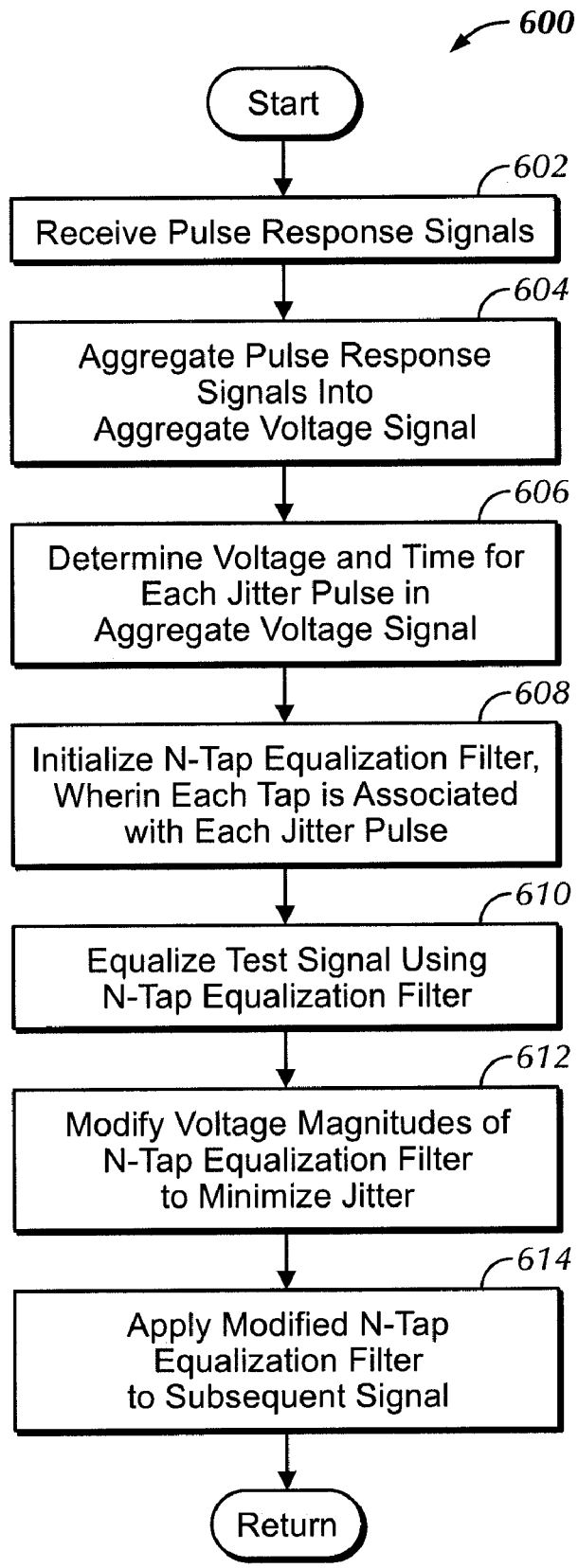
FIG. 6 shows a flow chart in accordance with one or more embodiments of the claimed invention.

The operation of one or more embodiments will now be described with respect to FIG. 6. FIG. 6 shows a logical flow diagram of a process 600 or determining an n-tap equalization filter for minimizing ringing in a channel in accordance with one or more embodiments of the claimed invention. The process 600 may be implemented, for example, within transmitter 102 and/or channel 104 of FIG. 1.

Process 600 begins at block 602, where a plurality of signals are received at the receiver, e.g., receiver 106 of FIG. 1, wherein each signal comprises a plurality of pulses representing a bit stream. In one or more embodiments, the plurality of signals is received using digital sampling of the plurality of signals. In one or more embodiments, the digital sampling comprises recording a signal at a plurality of unit interval (UI) boundaries. In one or more embodiments, one UI is 100 ps for a transmission rate of 10 Gb/s.

At block 604, the plurality of received signals is aggregated into an aggregate voltage signal comprising a main cursor pulse and a plurality of jitter pulses of lesser magnitudes than the main cursor pulse. In one or more embodiments, aggregating comprises converting the received signals from a frequency domain to a time domain. In another embodiment, aggregating comprises averaging the received signals. In one or more embodiments, each of the plurality of jitter pulses may occur at a UI boundary of the aggregate voltage signal. Processing then continues to block 606.

At block 606, for each of the plurality of jitter pulses, a voltage magnitude and a time 10 for each of the plurality of jitter pulses is determined. Processing then continues to block 608.

At block 608, an n-tap equalization filter comprising a plurality of taps associated with a different one of the plurality of jitter pulses is initialized. In one or more embodiments, each tap occurs at a time-domain point related to the time of the corresponding jitter pulse such that, each tap has an output voltage related to the inverse of the voltage magnitude of the corresponding jitter pulse. Further, the n-tap equalization filter comprises a pre-tap of a negative voltage magnitude. In one or more embodiments, a number of taps in the n-tap equalization filter is two or greater. In one or more embodiments, at least one of the taps in the n-tap equalization filter is configured to de-emphasize a portion of a signal. In one or more embodiments, the n-tap equalization filter further comprises a main-tap configured to de-emphasize an associated main cursor pulse within the test signal. Processing then continues to block 610.

At block 610, a test signal sent over the channel is equalized with the n-tap equalization filter. In one or more embodiments, a filter embodying the n-tap equalization filter is applied to a signal sent from the sender. In one or more embodiments, the filter may measure the current from the sender. Thus, the filter adjusts the signal from the transmitter based on the n-tap equalization filter and the measured current. In one or more embodiments, the output signal based on a 3-tap filter may be the signal from FIG. 4A or a 5-tap filter of FIG. 5B. In one or more embodiments, the filter may instead drive its output based on a measured voltage from the sender, and the n-tap equalization filter. Processing then continues to block 612.

At block 612, at least one voltage magnitude of at least one of the plurality of taps is modified to minimize an amount of jitter from the test signal. In one or more embodiments, the amount of jitter comprises a variation of another jitter pulse within the test signal from a ground voltage. In one or more embodiments, modifying the at least one voltage magnitude further comprises changing the magnitude of at least two of the plurality of taps while maintaining an overall energy output. Processing then continues to block 614.

At block 614, the modified n-tap equalization filter is applied to a subsequent signal sent by the transmitter over the channel. For example, the modified n-tap equalization filter may be embodied in a production device, or the like. Processing then continues to other steps for further processing.

The invention may be implemented on virtually any type of computer regardless of the platform being used. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

Advantageously, the embodiments of the claimed invention may allow minimized ringing in a high speed channel between a transmitter and a receiver in a circuit.

What is claimed is:

1. A method for minimizing ringing in a high speed channel between a transmitter and a receiver in a circuit, comprising:
   receiving a plurality of signals from the transmitter to the receiver via the channel, wherein each signal of the plurality of signals comprises a plurality of pulses representing a bit stream;
   aggregating the plurality of received signals into an aggregate voltage signal comprising a main cursor pulse and a plurality of jitter pulses, wherein each jitter pulse of the plurality of jitter pulses comprises a lesser magnitude than the main cursor pulse;
   determining a voltage magnitude and a time for each of the plurality of jitter pulses; and
   initializing an n-tap equalization filter comprising a plurality of taps, wherein each tap of the plurality of taps is associated with at least one jitter pulse of the plurality of jitter pulses,
      wherein each tap of the plurality of taps occurs at a time-domain point related to the time of the corresponding jitter pulse,
      wherein each tap has an output voltage related to an inverse of a voltage magnitude of the corresponding jitter pulse,
      wherein the n-tap equalization filter is configured to equalize signals transmitted over the channel, and
      wherein the n-tap equalization filter further comprises a main-tap configured to deemphasize an associated main cursor pulse within a subsequent signal;
   equalizing a test signal over the channel with the n-tap equalization filter;
   modifying at least one voltage magnitude of at least one of the plurality of taps to minimize an amount of jitter from the test signal; and
   applying the modified n-tap equalization filter to a subsequent signal sent by the transmitter over the channel.

2. The method of claim 1, wherein the amount of jitter comprises a variation of another jitter pulse within the test signal from a ground voltage.

3. The method of claim 1, wherein modifying further comprises,
   changing the magnitude of at least one two of the plurality of taps while maintaining an overall energy output.

4. The method of claim 1, wherein the n-tap equalization filter further comprises a pre-tap of a negative voltage magnitude.

5. The method of claim 1, wherein a number of taps in the n-tap equalization filter is equal to at least two.

6. The method of claim 1, wherein the n-tap equalization filter is a Finite Impulse Response (FIR) filter.

7. The method of claim 1, wherein the coefficients for the n-tap filter comprise at least one selected from the group consisting of: −0.3, 0.05, and −0.05.

8. The method of claim 1, wherein the n-tap equalization filter further comprises a main-tap configured to deemphasize an associated main cursor pulse within the test signal.

9. A circuit for minimizing ringing in a high speed channel between a transmitter and a receiver, comprising:
   a component for initializing an n-tap equalization filter comprising a plurality of taps associated with a different one of a plurality of jitter pulses received from the transmitter at the receiver and over the channel,
      wherein a number of the plurality of jitter pulses is equal to at least two, wherein each tap occurs at a time-domain point related to a time of a corresponding jitter pulse included within the plurality of jitter pulses, wherein the n-tap equalization filter is configured to equalize a test signal over the channel, and wherein the n-tap equalization filter further comprises a main-tap configured to deemphasize an associated main cursor pulse within a subsequent signal;

a component for modifying at least one voltage magnitude of at least one of the plurality of taps to minimize an amount of jitter from the test signal; and a component for applying the n-tap equalization filter to a subsequent signal sent over the channel.

10. The circuit of claim 9, wherein each tap has an output related to an inverse of a magnitude of the corresponding jitter pulse.

11. The circuit of claim 9, wherein the n-tap equalization filter further comprises a pre-tap of a negative magnitude.

12. The circuit of claim 9, wherein the n-tap equalization filter is a Finite Impulse Response (FIR) filter.

13. The circuit of claim 9, wherein at least one of the taps in the n-tap equalization filter is configured to deemphasize a portion of the subsequent signal.

14. A system for minimizing ringing in a high speed channel between a transmitter and a receiver in a circuit, comprising:

a component for initializing an n-tap equalization filter comprising a plurality of taps associated with a different one of a plurality of jitter pulses received from the transmitter at the receiver and over the channel, wherein a number of the plurality of jitter pulses is greater than two, wherein each tap occurs at a time-domain point related to a time of a corresponding jitter pulse included within the plurality of jitter pulses, wherein the n-tap equalization filter is configured to equalize a test signal over the channel, and wherein the n-tap equalization filter further comprises a main-tap configured to deemphasize an associated main cursor pulse within a subsequent signal;

a component for modifying at least one voltage magnitude of at least one of the plurality of taps to minimize an amount of jitter from the test signal; and a component for applying the n-tap equalization filter to a subsequent signal sent over the channel.

15. The system of claim 14, wherein each tap has an output related to an inverse of a magnitude of the corresponding jitter pulse.

16. The system of claim 14, wherein the circuit is a complementary metal-oxide semiconductor (CMOS) circuit.

17. The system of claim 14, wherein the transmitter a fully buffered dual in-line memory module (FB-DIMM).

18. A system for minimizing ringing in a high speed channel between a transmitter and a receiver in a circuit, comprising:

a component for initializing an n-tap equalization filter comprising a plurality of taps associated with a different one of a plurality of jitter pulses received from the transmitter at the receiver and over the channel, wherein a number of the plurality of jitter pulses is greater than two, wherein each tap occurs at a time-domain point related to a time of a corresponding jitter pulse included within the plurality of jitter pulses, wherein the n-tap equalization filter is configured to equalize a test signal over the channel, and wherein the n-tap equalization filter further comprises a main-tap configured to deemphasize an associated main cursor pulse within a subsequent signal; and a component for applying the n-tap equalization filter to a subsequent signal sent over the channel, wherein the channel is configured to communicate data at 11.2 Gb/s or greater.

* * * * *